United States Patent [19]

Nishi

[11] Patent Number: 4,663,791
[45] Date of Patent: May 12, 1987

[54] ARTIFICIAL HONEYCOMB FOR KEEPING HONEYBEES AND METHOD FOR ARTIFICIAL BEEKEEPING BY USE THEREOF

[76] Inventor: Shoei Nishi, 2490 Iseji, Nanseicho, Watarai-gun, Mie-ken, Japan

[21] Appl. No.: 790,985

[22] Filed: Oct. 24, 1985

[30] Foreign Application Priority Data

Nov. 1, 1984 [JP] Japan ................................ 59-228963

[51] Int. Cl.⁴ ............................................. A01K 47/04
[52] U.S. Cl. ....................................................... 6/11
[58] Field of Search ........................................ 6/10, 11

[56] References Cited

U.S. PATENT DOCUMENTS

| | | | |
|---|---|---|---|
| 1,051,830 | 1/1913 | Calkins et al. | 6/11 |
| 1,580,513 | 4/1926 | Long | 6/10 X |
| 1,806,987 | 5/1931 | Strahan | 6/10 X |
| 2,201,100 | 5/1940 | Rushing | 6/10 |
| 4,280,236 | 7/1981 | Herman | 6/11 X |

Primary Examiner—Robert P. Swiatek
Attorney, Agent, or Firm—Schwartz & Weinrieb

[57] ABSTRACT

An artificial honeycomb comprises a bottom plate and deep cells formed on at least one of the opposite sides of the bottom plate with a material incapable of being processed by honeybees. Each of the deep cells has a size large enough for worker bees to crawl in and do their chores and for the queen bee to insert her abdomen and not large enough for the leading end of her ovipositor to reach the bottom plate.

11 Claims, 6 Drawing Figures

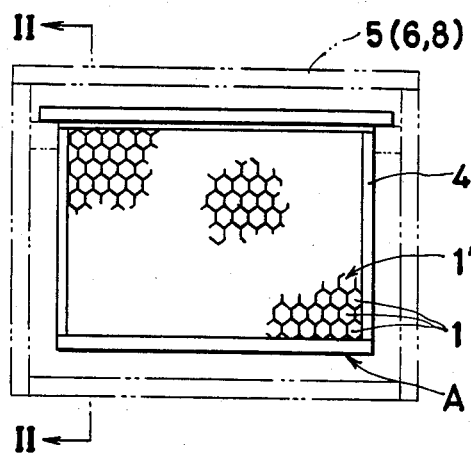
FIG_1
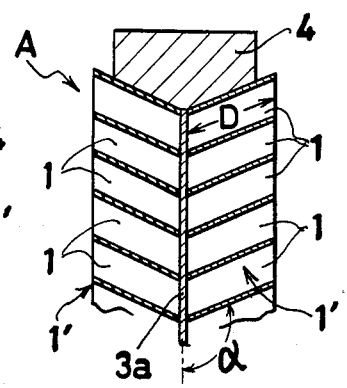
FIG_2
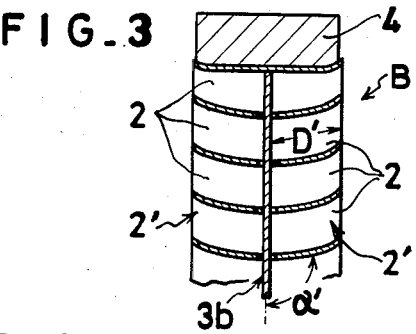
FIG_3 (PRIOR ART)
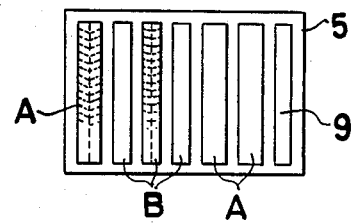
FIG_4
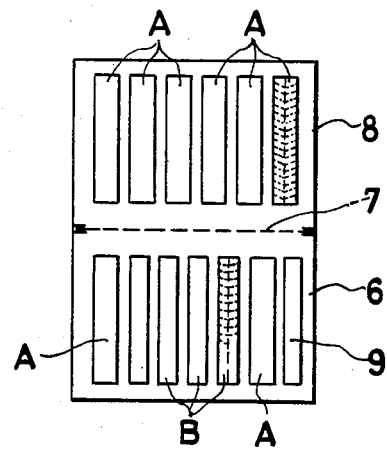
FIG_5
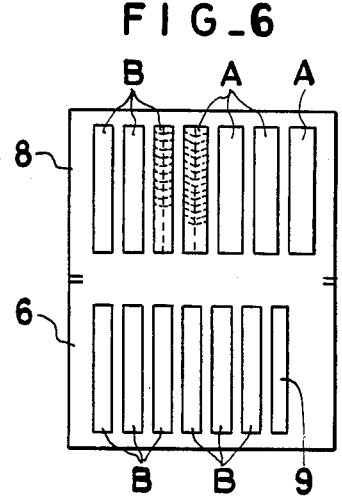
FIG_6

ARTIFICIAL HONEYCOMB FOR KEEPING HONEYBEES AND METHOD FOR ARTIFICIAL BEEKEEPING BY USE THEREOF

FIELD OF THE INVENTION

This invention relates to an artificial honeycomb for beekeeping having the cells thereof formed of a material incapable of being processed by bees and to a method for artificial beekeeping by the use of the artificial honeycomb.

BACKGROUND OF THE INVENTION

As universally known, a colony of honeybees consists of one queen bee devoted to laying eggs in the cells, a few male bees (drones) for mating with the queen bee, and a large number of worker bees which are female but sexually imperfect. The queen bee gives pheromone to worker bees to neutralize them sexually and, at the same time, leads the colony. The worker bees, by producing royal jelly, help the queen bee in promoting her ovarial development and activating her fertility and the larvae (grubs) in attaining growth. The worker bees, which have a lifespan of about one month after emergence, spend about 20 days immediately following emergence in cleaning the cells and the honeycomb as a whole, feeding the queen bee and the larvae with royal jelly, building the honeycomb, and storing pollen and honey, and spend about 10 remaining days in going out of the honeycombs in search of pollen and nectar in preparation for the winter season. The pollen and nectar they collect pass on to the younger worker bees for storage in the cells. During their entire life, the worker bees defend the colony against attack by enemies.

Artificial beekeeping for collection of honey and pollination of plants makes use of the aforementioned habits of honeybees.

In conventional artificial beekeeping, a thin waxplate, press-formed with hexagonal cells on both sides, is fixed within a frame and this frame is hung inside the hive at the honeybees' hive-building period, thus encouraging the honeybees to build cells on the opposite sides of the waxplate (foundation) and complete a honeycomb for storage of eggs, larvae, pollen, and honey, and then hanging a multiplicity of such honeycombs in the hive so that the honeybees can maintain the colony. While the cells so built by the honeybees are chiefly for use by the worker bees, cells of a slightly larger cross-sectional area than those for the worker bees are also built at corners of the honeycomb for accommodating male bees.

The cells the honeybees build on the opposite sides of each foundation for use by the worker bees have a cross-sectional area large enough for the worker bees to crawl into head on for tending to the larvae and storing pollen and honey and also large enough to allow the queen bee to insert her abdomen for laying eggs. The depth of the cells from their entrances to the foundation is such that the leading end of the ovipositor of the queen bee reaches the foundation when the queen bee thrusts her abdomen in the cell. This depth generally runs in the range of 12 to 14 mm, though it is variable with the size of the honeybees depending on their species.

Whenever the cells are emptied in consequence of emergence, younger worker bees clean the interiors of the empty cells to prepare them for the queen bee to lay eggs therein as by removing dead bees, dead eggs, dead larvae or other debris from the cells and discard them outside of the hive. They tend to larvae hatched from eggs by feeding them with royal jelly, fly out of the hive to receive the pollen and nectar brought home by older worker bees, and store them in the cells set aside exclusively for this purpose. In each of the empty cells already cleaned by the younger worker bees, the queen bee inserts her abdomen until the leading end of her ovipositor reaches the foundation and lays one egg. The eggs so laid hatch in about three days. During the three-day interval, the eggs are enveloped with royal jelly by the worker bees. After the hatching, the larvae feed on the royal jelly until they grow into pupas. About 21 days after they are laid, they come out of the cells as imagines.

As the number of worker bees gradually increases and substantially all the cells of the honeycombs in the hive are filled with eggs, larvae, pupas, honey, and pollen, there arises a shortage of cells available for laying eggs. Thus, the queen bee contracts what is called "neurosis" and suffers from insufficient secretion of pheromone to be given to the worker bees and loses in power to lead worker bees. Owing to the shortage of cells for storage of pollen and honey, the worker bees come to devote less efforts to the chore of nectar collection. A group of bees develop the swarming fever and the worker bees prepare to support a new queen bee. The old queen bee, accompanied by a bunch of worker bees selected from the group of honeybees loyal to her, swarms. Consequently, the colony of honeybees is divided into two new colonies. Each of the two colonies resulting from the swarm has an insufficient number of worker bees and, therefore, suffers from deficiency in nectar-collecting capacity, this situation continues until the number of worker bees has increased sufficiently.

It has been customary to solve this problem by removing the upper lid of the hive when all the cells of the honeycombs within the hive become substantially saturated, covering the open upper end of the hive with a partition (queen excluder) enabling the worker bees and not the queen bee to crawl therethrough, superposing a super-hive on the partition, suspending honeycomb made by honeybees inside the super-hive, and allowing the worker bees to store pollen and honey in the cells on the honeycomb in the super-hive.

It has been generally held that owing to the measure described above, the worker bees are precluded from developing swarming fever because they are enabled to crawl through the queen excluder, clean the cells in the lower hive, tend the larvae, receive pheromone from and give royal jelly to the queen bee and, at the same time, store pollen and honey in the cells of the honeycombs in the super-hive, while the queen bee is allowed to lay eggs only in the empty cells in the lower hive which have already been cleaned by the worker bees and, therefore, the otherwise inevitable excessive increase of the number of worker bees in one group is avoided.

It is exclusively in the cells in the lower hive which have been emptied as by emergence and then cleaned by worker bees in the honeycombs that the queen bee is allowed to lay her eggs. In the circumstance, the queen bee's urge to lay eggs is not satisfied and her secretion of pheromone meant for worker bees dwindles with her contraction of neurosis and the worker bees are psychologically disturbed by the frustration they feel upon not receiving sufficient pheromone from the queen bee. In short, both the queen bee and the worker bees suffer from frustration and the overall nectar-collecting capacity of the honeybees of the colony becomes deficient, possibly with the result that some of the worker bees develop swarming fever and proceed to swarm. The question as to whether or not the worker bees have developed swarming fever cannot be definitely answered unless the super-hive and the queen excluder are removed and the honey bees in the lower hive are visually examined. Thus, the beekeeping by the method under discussion takes much time and labor.

To avoid this trouble, there has been developed and adopted a practice of superposing a super-hive on the basic hive without using a queen excluder, suspending five to seven honeycombs made by honeybees and one feeder within a hive having a capacity for ten honeycombs, for example, suspending nine honeycombs within the super-hive, allowing the honey bees to build honeycombs of their own in the spaces remaining inside the hives and preventing them from developing swarming fever and, when the honeycombs are completed, removing the completed honeycombs, and collecting beewax from the honeycombs. This method, however, has the following disadvantage.

During the season when nectar is available first from rape-seed and then from lotus, buck-eye, acacia, and the like, the worker bees tend to store honey in the upper cells so that the upper cells of the super-hive become filled with honey, giving the queen bee no choice but to lay eggs in the empty lower cells. This leads to a favorable situation inasmuch as only 20 to 30% of the cells in the super-hive ordinarily come to be occupied by the larvae. In recent years in Japan, however, there has been a considerable increase in the number of honeybee colonies being kept so that the amount of honey that can be collected by an individual colony has decreased. Thus, even when a super-hive is provided, 70 to 80% of the cells come to be occupied by the larvae. This increase in number of the larvae leads to a number of problems. One of these is that the honeybees are more apt to develop swarming fever and another is that since the temperature of the cells occupied by the larvae is kept high, it may result in the death of a substantial percentage of the larvae during the travel of the hives in their sealed state. Moreover, the young house worker bees will consume large amounts of honey and pollen, decreasing the amount that is stored, and the number of workers will vary greatly from season to season. Therefore, the aforesaid beekeeping method can hardly be called an efficient one during times when the amount of nectar available is limited, as is the case nowadays. Fundamentally, therefore, it has become necessary to develop a method for controlling the number of worker bees.

OBJECT AND SUMMARY OF THE INVENTION

An object of this invention is to provide an artificial honeycomb for beekeeping, which allows the queen bee to satisfy her urge to lay eggs, encourages the worker bees to collect and store honey, and permits control of the number of worker bees.

To be specific, this invention concerns an artificial honeycomb produced by forming, on either or both of the opposite sides of a bottom plate, cells of a material incapable of being processed by honeybees, the size of the cells being such that worker bees are allowed to enter head on to carry out their chores and the queen bee is allowed to insert her abdomen but not allowed to have the leading end of her ovipositor reach the bottom plate (floorboard). In either or both of the basic hive and a super-hive superposed thereon, a number of artificial honeycombs constructed as described above are suspended in combination with honeycombs produced by honeybees in such a manner that the queen bee is free to have access to the cells of the aforementioned artificial honeycombs.

The cells which honey bees build on the opposite sides of the comb foundation have as a small depth in the range of 12 to 14 mm as described above. The queen bee inserts her abdomen in each of these cells until the leading end of her ovipositor reaches the foundation and lays one egg. The worker bees envelop the eggs in the cells with royal jelly before the eggs hatch. When deeper cells are formed of a material incapable of being processed by honeybees on either or both of the opposite sides of the bottom plate as contemplated by the present invention, since the queen bee is allowed to insert her abdomen into the cells but is not allowed to have the leading end of her ovipositor reach the floorboard (bottom plate), she has no alternative but to put the leading end of her ovipositor on the inner wall of the cell halfway along the entire depth thereof and lay an egg there. The worker bees ignore the eggs so laid on the inner walls of the cells and urge the queen bee to lay eggs on the floorboard. The queen bee, thus, is compelled to lay five to seven eggs on the inner wall of each of the cells.

Since the worker bees ignore these eggs, practically all of these eggs are left unhatched. In the meantime, the queen bee's urge to lay eggs is fully satisfied at any rate and is enabled to secrete pheromone vigorously, furnish the worker bees amply with the pheromone, and exercise complete control over the worker bees.

The ratio of artifical honeycombs to natural honeycombs of the honeybees' own production which are suspended in a hive has direct bearing on the control of the number of eggs which hatch and on the control of the number of worker bees.

BRIEF DESCRIPTION OF THE DRAWINGS

The other objects and characteristics of this invention will become apparent from the description given in further detail below with reference to the accompanying drawings, wherein:

FIG. 1 is a front view of an artifical honeycomb of one embodiment of this invention;

FIG. 2 is an enlarged sectional view taken along the line II—II of FIG. 1;

FIG. 3 is an enlarged sectional view of a honeycomb built by honeybees;

FIG. 4 is a sectional view illustrating a typical state of beekeeping by the present invention using artificial honeycombs and honeycombs of honeybees' own production in combination;

FIG. 5 is a sectional view illustrating another embodiment of this invention; and FIG. 6 is a sectional view illustrating yet another embodiment of the present invention.

DETAILED DESCRIPTION OF THE PREFERRED EMBODIMENT

Referring to the drawings, FIG. 1 is a front view of an artificial honeycomb "A" possessed of deep cells 1. FIG. 2 shows part of the aforementioned artificial honeycomb in section. And FIG. 3 shows in section part of a honeycomb "B" having cells 2 built by honeybees on the opposite sides of a comb foundation 3b.

A bottom plate (floorboard) 3a for cells of the artificial honeycomb "A" is made of waxplate or some other artificial material and a comb foundation 3b on which honeybees are allowed to build cells is made of waxplate. They are both set in place on the inner wall of a frame 4 in a hive 5. The deep cells 1 on the artificial honeycomb "A" are formed by a procedure of extruding a plastic substance incapable of being nibbled or processed by honeybees into a long tube of a suitable cross section such as a hexagon or a circle, cutting the long tube into a plurality of sections of a length equalling the depth D, and fusing the short cut tubes in a suitably adjoined state with wax, for example, thereby completing an aggregate of short tubes, by a procedure of extrusion molding the same plastic substance in the form of an aggregate of long tubes in an adjoined state and slicing the aggregate into sections of a length equalling the depth D, or by a procedure of injection molding the plastic substance into clusters of cells each resembling a sliced section of the aforementioned aggregate of tubes, and fastening such clusters of cells 1' as by adhesion to either or both of the opposite sides of the bottom plate 3a.

In contrast, the honeybee honeycomb "B" is obtained by fixing a comb foundation 3b fast in place on the inner wall of a frame 4, suspending the frame 4 inside a hive 5 for free use by the honeybees during their honeycomb-building period, and allowing the honeybees to build aggregates of cells 2' on both sides of the foundation 3b. The difference between the honeycomb "A" and the honeycomb "B" resides in the fact that since the depth D of the deep cells 1 from their entrance to the floorboard (bottom plate) 3a is greater than the depth D' of the cells 2 built by honeybees, the leading end of the queen bee's ovipositor is not allowed to reach the floorboard when the queen bee inserts her abdomen into any of the deep cells 1. The depth D is fixed so as to suit the species of honey bees being kept. It generally exceeds 17 mm or more and preferably falls in the range of 20 to 22 mm. In contrast, the depth D' of the cells made by the honeybees generally falls in the range of 12 to 14 mm.

The walls of the deep cells are made of a material such as plastic which is incapable of being processed by honeybees. The possibility that honeybees decrease the depth of the deep cells as by nibbling the walls of the cells to such an extent that the leading end of the queen bee's ovipositor will reach the floorboard when she inserts her abdomen in the cells is nil.

While the cross-sectional area of the deep cells 1 may be equal to that of the cells the worker bees of the honeybees being kept build, it is preferably an intermediate between that of worker cells and that of drone cells which is larger than that of worker cells so that the worker bees can crawl in and do their chores with ease.

The cells 2 of the honeycomb "B" built by honeybees are such that the angle $\alpha'$ of upward inclination of the cells 2 is about 95° to a distance of about 12 mm from the comb foundation 3b. From this point onward, the angle gradually increases as the spaces occupied by the honey stored in the cells extend past the aforementioned distance of 12 mm. Thus, the cells are curved upwardly. When the cells are in the state as described above, the separation of stored honey from the cells with a centrifugal separator cannot be easily carried out to perfection. Thus, the angle $\alpha$ of the upward inclination of the deep cells 1 is desired to be selected in the range of 100° to 140°.

Optionally, the artificial honeycomb of this invention may have the aggregate of cells 1' fastened to one side of the bottom plate (floorboard) 3a and set fast in place to the inner wall of the frame 4 in order for the honey bees to build cells on the other side of the bottom plate.

FIG. 4, FIG. 5, and FIG. 6 illustrate the conditions of beekeeping by the use of the aforementioned artificial honeycomb "A" and the honeybee honeycomb "B". FIG. 4 depicts a case wherein a nursing box 5 having no additional hive for queen rearing and for storing honey and pollen superposed thereon is used as a bee hive, FIG. 5 is a case wherein a queen excluder 7 is mounted on a base hive 6 and a super-hive 8 is superposed thereon, and FIG. 6 is a case wherein a super-hive 8 is superposed directly on a base hive 6 without intervention of a queen excluder. In the diagrams, 9 stands for a feeder which is formed by cutting a portion 10 to 20 cm in length off the upper member of the watertight box to form an entrance for honeybees. It is filled with sugar solution or honey of poor quality as feed for worker bees.

In the cases of FIG. 4 and FIG. 5, since artificial honeycombs "A" and honeybees' honeycombs "B" are suspended in combination within nursing boxes (hive) 5 and hives 6, the queen bee in either case has free access to the deep cells of any of the artificial honeycombs "A" within the hive. In the case of FIG. 6 all the honeycombs suspended inside the hive 6 are honeybee honeycombs "B" and those in the super-hive 8 partly include artificial honeycombs "A". (It is permissible for all of them to be artificial honeycombs.) Since no queen excluder is interposed between the base hive 6 and the super-hive 8, the queen bee in this case has free access also to the deep cells of the artificial honeycombs inside the super-hive.

When the deep cells 1 of the artificial honeycombs "A" are empty and have been cleaned by worker bees, the queen bee is urged by nature to insert her abdomen into these cells and lay one egg in each. When she inserts her abdomen in these cells, however, she cannot make the leading end of her ovipositor reach the floorboards of the cells. She is thus compelled to put the leading end of her ovipositor on the inner walls of the cells halfway along their entire length and lay eggs. In the meantime, the worker bees envelop the eggs laid on the floorboard with royal honey and ignore the eggs laid on the inner walls of the cells and urge the queen bee to lay eggs. The queen bee is thus made to lay five to seven eggs on the average on the inner wall of each of the cells. Since the eggs thus laid on the inner walls of the cells are ignored by the worker bees, virtually none of these eggs hatch. These eggs soon disappear, presumably because they are eaten by the worker bees or they are discarded by the worker bees. Whenever the deep cells are cleaned by the worker bees, the queen bee again lays five to seven eggs on the inner walls of each of the deep cells. Honeycombs having cells made by the honey bees and permitting the leading end of the queen bee's ovipositor to reach the comb foundation thereof are also used in the remaining space of the hive and in the remaining space of the super-hive. The eggs laid in the cells of these honeycombs safely hatch. The larvae hatched from the eggs feed on royal jelly and attain full growth into pupas. Eventually, worker bees emerge from these pupas and depart from the cells.

In short, the queen bee lays eggs in the cells set aside by honeybees for egg laying including the deep cells in which the laid eggs do not hatch. Consequently, the queen bee's urge to lay eggs is fully satisfied and she is consequently enabled to secrete pheromone vigorously, give pheromone to the worker bees, and exercise control over the worker bees. Thus, the worker bees devote themselves fully to storage of pollen and honey instead of developing swarming fever. In this manner, the hatching of eggs is controlled and the colony of honeybees is controlled without frustrating the queen bee's urge to lay eggs. Further, since the deep cells which the worker bees have selected for the storage of honey and pollen have a large depth and are capable of storing honey and pollen in large amounts, the worker bees are enabled to vent their urge to collect and store honey.

Since the artificial honeycombs "A" of deep cells and the honeybee honeycombs "B" having shallow cells are used jointly, the queen bee is allowed to insert her abdomen also in the shallow cells of the honeybee honeycombs and lay eggs on the comb foundation. These eggs, upon being enveloped with royal jelly, safely hatch. Then, the larvae from the eggs eventually emerge as fully developed bees.

In an artificial honeycomb containing cells of varying depths, a queen bee was allowed to lay eggs on the inner walls of the cells and the cells in which the eggs hatched were counted to determine the ratio of successful cells.

The honeybees used for this experiment were an Italian hybrid. Ten each of cells of four different depths (16 mm, 18 mm, 20 mm, and 22 mm each) were provided. The queen bee laid five to seven eggs in the cells along the inner walls thereof at a distance of 15 mm inwardly from the entrances of the cells.

The number of eggs which attained full growth into honey bees within ten days of their birth was recorded as the survival ratio of the cells of the depth concerned. The results are shown below.

| Depth of cells (mm) | Survival ratio (%) |
|---|---|
| 16 | 50 to 60 |
| 18 | 20 |
| 20 | 1 (max.) |
| 22 | 0 |

In the case of the cells having the depth of 16 mm, the survival ratio was as high as 50 to 60% presumably because the eggs laid on the floorboards of the cells accounted for slightly less than 10% and because the positions of the eggs laid were at a distance of 15 mm inwardly from the entrances of the cells and, therefore, were near the floorboards of the cells and part of the eggs so laid on the inner walls rolled down and reached the floorboard of cells and the worker bees enveloped them with royal jelly before hatching or they mistook these eggs for the eggs laid on the floorboard and enveloped them with royal jelly. In the case of the cells of a depth of 18 mm, no eggs were laid on the floorboards of the cells. The ratio of 20% registered in this case is presumed to result from the fact that the position of the eggs laid on the inner walls of cells in this case were 2 mm farther from the floorboards of the cells than in the case of the cells having the depth of 16 mm so that the ratio of the eggs enveloped with royal jelly by the worker bees was proportionately lower.

In the case of the cells having a depth of 20 mm, the survival ratio was less than 1%. In the case of the cells having a depth of 22 mm, the survival ratio was 0%. Virtually none of the eggs laid in the cells hatched.

The hatching ratio based on the number of eggs laid can be expressed by the quotient of the survival ratio (over a period of 10 days) divided by the product of the number of eggs multiplied by the number of days required for hatching. Since the number of eggs averages 5 and the number of days required for hatching is 3, the following percentages are obtained by calculation for the cells of the depths indicated.

| Depth of cells (mm) | |
|---|---|
| 16 | $50 - 60 \div 15 \neq 3.6\%$ |
| 18 | $20 \div 15 \neq 1.3\%$ |
| 20 | $1 \div 15 \neq 0.07\%$ |

As demonstrated above, the use of the artificial honeycombs possessed of deep cells according with this invention restrains eggs from being hatched, satisfies the queen bee's urge to lay eggs, promotes her secretion of pheromone, and prevents the worker bees from developing swarming fever without suppressing egg-laying by the queen bee.

These artificial honeycombs are installed inside a hive in combination with natural honeycombs having shallow cells so that the queen bee will have free access to the two types of honeycombs. In this case, the percentage of the natural honeycombs is increased over that of the artificial honeycombs when the number of worker bees in a given group of honeybees is desired to be increased. Conversely, the percentage of the artificial honeycombs is increased over that of the natural honeycombs when the number of worker bees is desired to be decreased. Thus, the number of worker bees in the group of honeybees can be freely controlled without frustrating the queen bee's urge to lay eggs.

Obviously, many variations and modifications of the present invention can be made in light of the above teachings. It is therefore to be understood that within the scope of the appended claims, the present invention may be practiced otherwise than as specifically described herein.

What is claimed is:

1. An artificial honeycomb, comprising in combination:
   a bottom plate; and
   cells formed upon at least one of the sides of said bottom plate with a material incapable of being processed by honeybees,
   said cells having a standard sized width which is large enough for worker bees to crawl in and out of so as to perform their chores and for the queen bee to insert her abdomen within the opening of each of said cells, however, for each particular species of honeybees being kept, the depth of each of said cells is such that the leading end of the queen bee's ovipositor cannot reach said bottom plate when the abdomen of said queen bee is disposed within the opening of each of said cells whereby the queen bee is forced to deposit her eggs upon a sidewall portion of each of said cells.

2. An artificial honeycomb according to claim 1, wherein the depth of said cells is more than 17 mm.

3. A honeycomb as set forth in claim 2, wherein:
   said depth of each of said cells is within the range of 20-22 mm.

4. An artificial honeycomb according to claim 1 or claim 2, wherein the angle of the upward inclination of said cells is more than 100°.

5. A honeycomb as set forth in claim 4, wherein: said angle of inclination is within the range of 100°–140°.

6. In a method for the artificial beekeeping of honeybees with a foundation set in place one each within frames, said method including the steps of allowing said honeybees to build cells upon both sides of said foundation, suspending the resultant honeycombs within a hive, and keeping said honeybees, the improvement which comprises:

suspending within part of the interior of said hive artificial honeycombs each constructed of a combination of a bottom plate and cells formed upon at least one of the sides of said bottom plate with a material incapable of being processed by said honeybees, said cells having a standard sized width which is large enough to permit worker bees to crawl in and out of so as to perform their chores and for the queen bee to insert her abdomen within the opening of each of said cells, however, for each particular species of honeybees being kept, the depth of each of said cells is such that the leading end of the queen bee's ovipositor cannot reach said bottom plate when the abdomen of said queen bee is disposed within the opening of each of said cells whereby the queen bee is forced to deposit her eggs upon a sidewall portion of each of said cells.

7. A method according to claim 6, wherein said hive comprises a base hive and a super-hive disposed so that the interior of said super-hive communicates with the interior of said base hive.

8. A method as set forth in claim 6, wherein: the depth of each of said cells is at least 17 mm.

9. A method as set forth in claim 8, wherein: the depth of each of said cells is within the range of 20–22 mm.

10. A method as set forth in claim 6, wherein: said sidewalls of each of said cells forms an angle with said bottom plate which is at least 100°.

11. A method as set forth in claim 10, wherein: said angle is within the range of 100°–140°.

* * * * *